(12) United States Patent
Atwood et al.

(10) Patent No.: US 9,209,948 B2
(45) Date of Patent: *Dec. 8, 2015

(54) TESTING A DECISION FEEDBACK EQUALIZER ('DFE')

(71) Applicant: INTERNATIONAL BUSINESS MACHINES CORPORATION, Armonk, NY (US)

(72) Inventors: Eugene R. Atwood, Housatonic, MA (US); Matthew B. Baecher, Newburgh, NY (US); Minhan Chen, Cary, NC (US); Hayden C. Cranford, Jr., Cary, NC (US); William R. Kelly, Verbank, NY (US); Todd M. Rasmus, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,605

(22) Filed: Jan. 19, 2015

(65) Prior Publication Data

US 2015/0131707 A1 May 14, 2015

Related U.S. Application Data

(63) Continuation of application No. 13/921,470, filed on Jun. 19, 2013, now Pat. No. 9,014,254.

(51) Int. Cl.
*H04B 17/00* (2015.01)
*H04L 1/24* (2006.01)
*H04L 25/03* (2006.01)
*H04B 17/20* (2015.01)

(52) U.S. Cl.
CPC ............... *H04L 1/244* (2013.01); *H04B 17/00* (2013.01); *H04B 17/20* (2015.01); *H04L 25/03057* (2013.01); *H04L 25/03248* (2013.01)

(58) Field of Classification Search
CPC ............... H04L 25/03057; H04L 2025/0349; H04L 25/03146; H04L 1/242; H04B 17/0062
See application file for complete search history.

(56) References Cited

U.S. PATENT DOCUMENTS

| 6,937,617 | B2 * | 8/2005 | Rakib et al. ............... 370/485 |
| 7,590,175 | B2 | 9/2009 | Leibowitz et al. |
| 7,596,175 | B2 | 9/2009 | Chen |
| 2005/0180498 | A1 | 8/2005 | Bhakta et al. |

(Continued)

OTHER PUBLICATIONS

Payne, et al., "A 6.25-Gb/s Binary Transceiver in 0.13—μm CMOS for Serial Data Transmission Across High Loss Legacy Backplane Channels", IEEE Journal of Solid-State Circuits, Dec. 2005, pp. 2646-2657, vol. 40, No. 12, IEEE Computer Society, USA, DOI: 10.1109/JSSC.2005.856583.

*Primary Examiner* — Kenneth Lam
(74) *Attorney, Agent, or Firm* — Edward J. Lenart; Steven Meyers; Kennedy Lenart Spraggins LLP

(57) ABSTRACT

Testing a Decision Feedback Equalizer ('DFE'), the DFE including a summing amplifier operatively coupled to a plurality of latches and an input signal line for receiving a data signal, including: preventing a differential data signal from being received by the summing amplifier; and iteratively for each tap to be tested: setting a tap coefficient for each tap to zero; setting an output of the plurality of latches to a predetermined value; setting a tap coefficient for the tap to be tested to a full scale value; and determining whether a resultant output signal from the DFE matches a predetermined expected output signal.

13 Claims, 4 Drawing Sheets

(56) References Cited

U.S. PATENT DOCUMENTS

| | | | |
|---|---|---|---|
| 2008/0304559 A1* | 12/2008 | Wu et al. | 375/233 |
| 2010/0020861 A1 | 1/2010 | Leibowitz et al. | |
| 2012/0082203 A1 | 4/2012 | Zerbe et al. | |
| 2014/0376603 A1* | 12/2014 | Atwood et al. | 375/224 |

* cited by examiner

TESTING A DECISION FEEDBACK EQUALIZER ('DFE')

CROSS-REFERENCE TO RELATED APPLICATION

This application is a continuation application of and claims priority from U.S. patent application Ser. No. 13/921,470, filed on Jun. 19, 2013.

BACKGROUND

1. Technical Field

The technical field is data processing, or, more specifically, methods, apparatus, and products for testing a Decision Feedback Equalizer ('DFE').

2. Description of Related Art

Serial chip-to-chip communications at very high speed data rates can be limited by channel loss and intersymbol interference that arises from the physical characteristics of the data communications channel. An effective way for equalizing channel loss and negating the impact of intersymbol interference is to use a high performance Decision Feedback Equalizer in the receiver. Decision Feedback Equalizers can include many functional components whose reliability may be unknown. The complexity of a Decision Feedback Equalizer can result in significant challenges during manufacturing, as testing the component parts of a Decision Feedback Equalizer can be time intensive and burdensome.

SUMMARY

Methods, apparatuses, and products for testing a Decision Feedback Equalizer ('DFE'), the DFE including a summing amplifier operatively coupled to a plurality of latches and an input signal line for receiving a data signal, including: preventing a differential data signal from being received by the summing amplifier; and iteratively for each tap to be tested: setting a tap coefficient for each tap to zero; setting an output of the plurality of latches to a predetermined value; setting a tap coefficient for the tap to be tested to a full scale value; and determining whether a resultant output signal from the DFE matches a predetermined expected output signal.

The foregoing and other objects, features and advantages will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
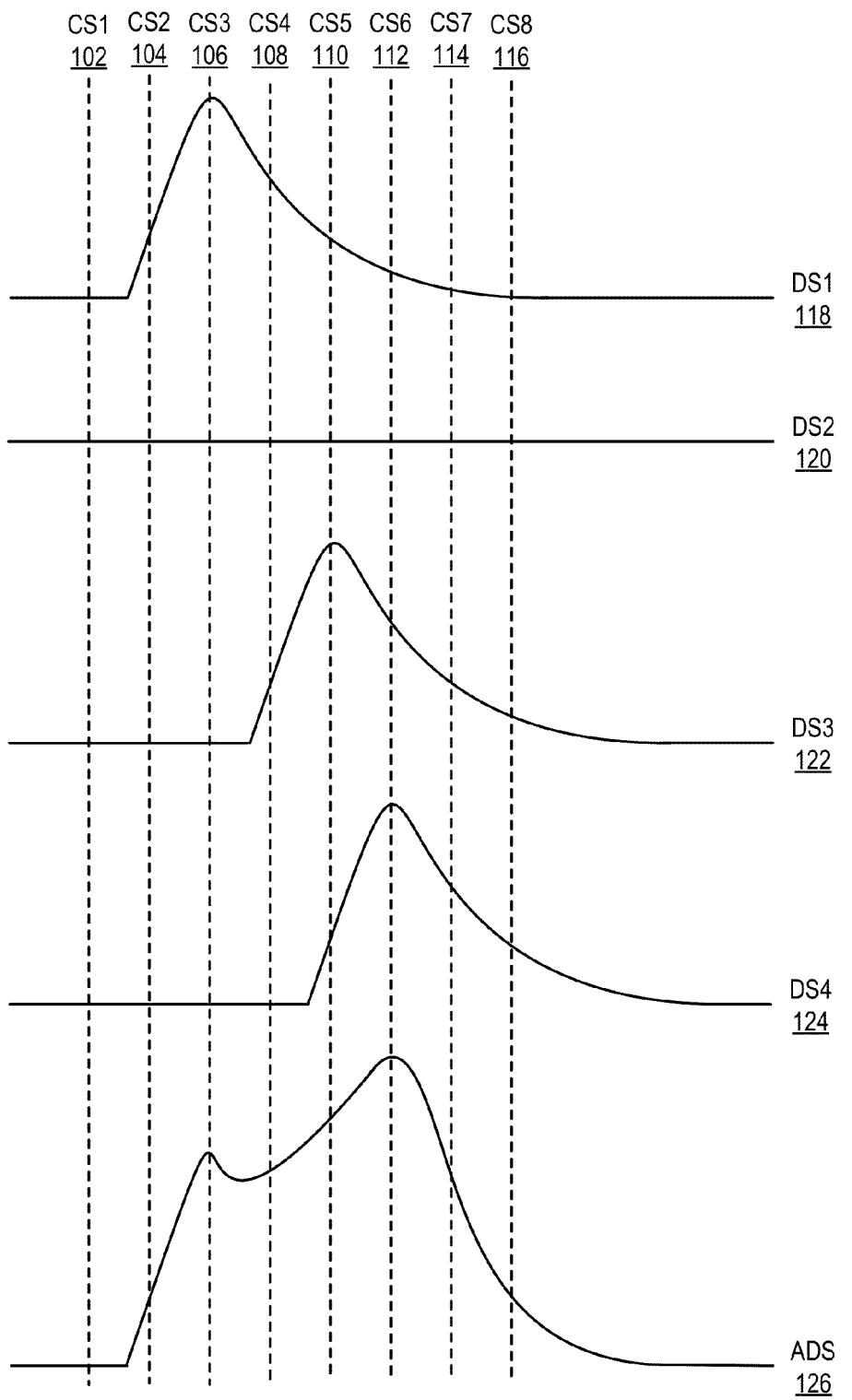
FIG. 1 sets forth a timing diagram illustrating a plurality of data signals received during a plurality of clock cycles.

Example methods, apparatus, and products are described for testing a DFE with reference to the accompanying drawings, beginning with FIG. 1. FIG. 1 sets forth a timing diagram illustrating a plurality of data signals received during a plurality of clock cycles. The example of FIG. 1 includes four data signals: data signal 1 (118), data signal 2 (120), data signal 3 (122), and data signal 4 (124). Each of the data signals (118, 120, 122, 124) may be embodied, for example, as a waveform transmitted over a single data communications channel between a sender and receiver, such as two digital circuits or other forms of computer hardware. In the example of FIG. 1, each of the data signals (118, 120, 122, 124) can represent a discrete value, such as a binary 0 or a binary 1. For example, a high voltage level can represent a binary 1 and a low voltage level can represent a binary 0. Each of the data signals (118, 120, 122, 124) is sampled by computer hardware in the receiver at a particular point in time to determine whether the data signal represents a binary 0 or a binary 1. Readers will appreciate that although the data signals (118, 120, 122, 124) are depicted as being different signals, each of the data signals (118, 120, 122, 124) are transmitted over the same data communications channel.

In the example of FIG. 1, eight clock signals are illustrated: clock signal 1 (102), clock signal 2 (104), clock signal 3 (106), clock signal 4 (108), clock signal 5 (110), clock signal 6 (112), clock signal 7 (114), and clock signal 8 (116). Each of the clock signals (102, 104, 106, 108, 110, 112, 114, 116) are generated by a clock and are used as a timing mechanism by computer hardware that samples a communications channel. For example, such computer hardware may sample the communications channel upon the receipt of each clock signal. Because the sampled voltage at each clock signal represents a particular discrete value such as a binary 0 or binary 1, by sampling the communications channel at each clock signal (102, 104, 106, 108, 110, 112, 114, 116), a sequence of discrete values such as a bit stream may be identified.

In the example of FIG. 1, three of the data signals (118, 122, 124) go to a high voltage level at various points in time. In such an example, the data signals (118, 122, 124) can represent a binary 1. Another data signal (120) remains at a low voltage level, thereby indicating that the data signal (120) represents a binary 0. In the example of FIG. 1, each of the data signals (118, 120, 122, 124) is transmitted over the same communication channel at different times. In the example illustrated in FIG. 1, assume that a binary 1 was transmitted at clock signal 3 (106), a binary 0 was transmitted at clock signal 4 (108), a binary 1 was transmitted at clock signal 5 (110), and a binary 1 was transmitted at clock signal 6 (112). In such an example, however, the voltage level that would be sampled at clock signal 3 (106), clock signal 4 (108), clock signal 5 (110), and clock signal 6 (112) would not be only the result of the specific data signal (118, 120, 122, 124) that was transmitted at each respective clock signal (106, 108, 110, 112). The voltage level that would be sampled at clock signal 3 (106), clock signal 4 (108), clock signal 5 (110), and clock signal 6 (112) would also include residual voltage from previously transmitted signals. This effect is referred to herein as intersymbol interference. To illustrate the effects of intersymbol interference, FIG. 1 includes an example data signal representing the aggregate data signal (126) that would result from transmitting each of the four data signals (118, 120, 122, 124) described above over a single data communications channel.

When a piece of computer hardware samples the data communications channel at a particular point in time, the voltage level sampled by the computer hardware may be impacted by previously received signals as a result of intersymbol interference. Consider an example in which the data communications channel is sampled at clock signal 6 (112). In such an example, assume that data signal 4 (124) is the data signal to be sampled at the point in time at which clock signal 6 (112) is generated. In such an example, data signal 4 (124) is at a high voltage level indicating that data signal 4 (124) is a binary 1. Readers will appreciate, however, the data signal 3 (122) and data signal 1 (118) are still introducing some voltage into the data communications channel, such that the voltage level sampled at the point in time at which clock signal 6 (112) is generated is greater than just the voltage level of data signal 4 (124). In such a way, intersymbol interference can cause the voltage level of a data communications channel to inaccurately represent the state of the current signal that is being transmitted across the data communications channel. The aggregate data signal (126) represents an example of a signal that could be sampled by computer hardware as a result of intersymbol interference.

Figure 2:
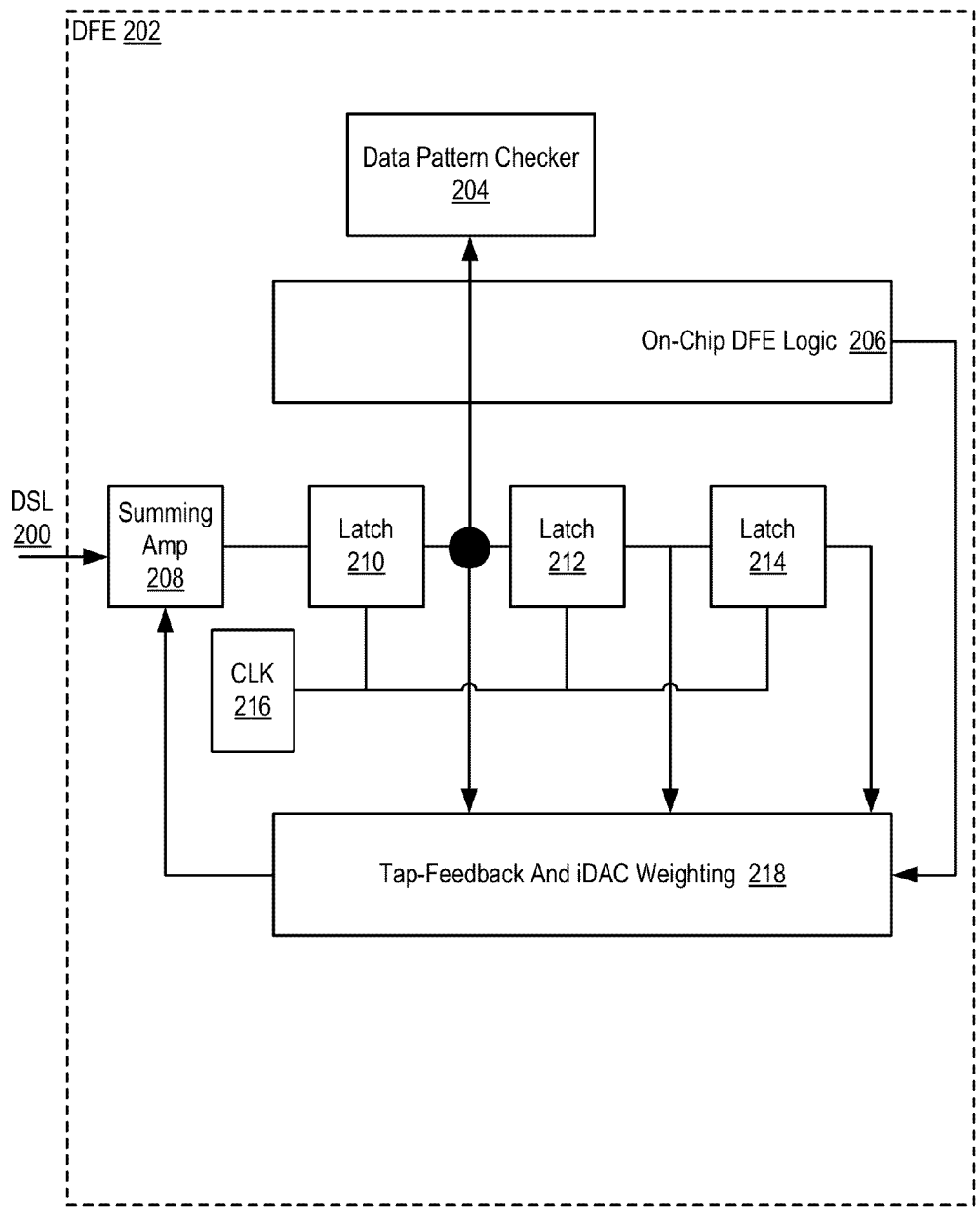
FIG. 2 sets forth a block diagram of an embodiment of a DFE for removing the effects of intersymbol interference.

For further explanation, FIG. 2 sets forth a block diagram of an embodiment of a DFE (202) for removing the effects of intersymbol interference. The DFE (202) of FIG. 2 is a module of automated computing machinery, such as a circuit, for reversing the distortion incurred by a signal transmitted through a data communications channel. A signal transmitted through a data communications channel may be distorted, for example, by intersymbol interference in which a previously received signal impacts a presently received signal. The DFE (202) of FIG. 2 can augment a standard linear equalizer by adjusting an incoming signal in dependence upon information gathered during the receipt of previous signals. The DFE (202) of FIG. 2 may reside, for example, within a receiver that receives a digital signal from a sender, such that the DFE (202) can account for any channel loss or intersymbol interference that occurred in transmitting the digital signal from the sender to the receiver.

The DFE (202) of FIG. 2 is coupled to a data signal line (200). The data signal line (200) of FIG. 2 represents a data communications channel for receiving a digital signal. Such a digital signal can represent a sequence of discrete values, such as a binary 0 or a binary 1. The digital signal may be embodied, for example, as a waveform that switches between a high voltage level and a low voltage level that represent a discrete value such as a binary 0 or binary 1. Although not depicted in FIG. 2, such a DFE (202) may be embodied as a ½ rate DFE (202) in which half of the incoming data signals are processed by one set of computing hardware while the other half of the incoming data signals are processed by another set of computing hardware as described below.

The DFE (202) of FIG. 2 includes a summing amplifier (208). The summing amplifier (208) of FIG. 2 may be embodied as circuitry for summing weighted values such as a plurality of weighted voltages. The summing amplifier (208) may be useful in restoring a digital signal received by the DFE (202) to the same state that the signal was transmitted by the sender, thereby overcoming the impact of channel loss or intersymbol interference by summing the received signal with values that are associated with previously received signals.

Consider an example in which an incoming signal is embodied as a differential signal that includes a first signal and a second signal, where the voltage between the two signals are used to determine whether the differential signal represents a binary 1 or a binary 0. For example, a differential voltage of 0.5 V could represent a binary 1 and a differential voltage of −0.5 V could represent a binary 0. In such an example, assume that a bit pattern of '101' is transmitted from a sender to a receiver. During a first clock cycle generated by a clock (216), the summing amplifier (208) would receive a signal with a differential voltage of 0.5 V over a data signal line (200). During a second clock cycle, even though the sender had transmitted a signal with a differential voltage of −0.5V, physical limitations of the data communications channel could cause some portion of the signal with a differential voltage of 0.5 V received during the first clock cycle to remain in the data communications channel. For example, the summing amplifier (208) may receive a signal with a differential voltage of −0.4 V over a data signal line (200) during the second clock cycle, as some portion of the first signal is interfering with the second signal (e.g., through intersymbol interference). In such an example, the summing amplifier (208) may also receive a feedback tap instructing the summing amplifier (208) to add −0.1 V to the incoming signal in order to remove the impact of intersysmbol interference, such that the summing amplifier (208) outputs a value of −0.5V, accurately representing the current signal adjusted for the impact of intersymbol interference. Such a feedback tap may be generated by a tap-feedback and iDAC weighting module (218) and provided as input to the summing amplifier (218) as described in greater detail below. In the example of FIG. 2, each tap represents a voltage offset that is applied to an incoming data signal in order to negate the effects of intersysmbol interference.

The DFE (202) of FIG. 2 also includes a plurality of latches (210, 212, 214). In the example depicted in FIG. 2, a first latch (210) may be coupled to the summing amplifier (208) and may operate as a sample latch for sampling the output of the summing amplifier (208) and determining whether such output represents a binary 1 or binary 0. In the example depicted in FIG. 2, a second latch (212) and a third latch (214) are coupled to other latches and may be configured to store a discrete value such as a binary 1 or binary 0. The DFE (202) of FIG. 2 can operate by latch (210) sampling the output of the summing amplifier (208) and determining whether the output of the summing amplifier (208) represents a binary 1 or binary 0. The latch (210) will subsequently store the binary 1 or binary 0. In a next clock cycle, latch (210) will transmit its stored value (a binary 1 or binary 0) to latch (212), determine whether the new output of the summing amplifier (208) represents a binary 1 or binary 0, and store the binary 1 or binary 0. This cycle is repeated such that latch (210) is transmitting its stored value to latch (212) and sampling the output of the summing amplifier (208) during each clock cycle. Likewise, latch (212) transmits its stored value to latch (214) during each clock cycle and also receives and stores a value from latch (210) during each clock cycle. In such a way, a sequence of binary values representing a sequence of data signals received by the DFE (202) may be retained by storing each binary value in different latch (210, 212, 214). For example, the most recently received binary value could be stored in latch (210), the second most recently received binary value could be stored in latch (212), and the third most recently received binary value could be stored in latch (214). Readers will appreciate that such a DFE (202) may include any number of latches for storing previously received values.

In the example of FIG. 2, each of the latches (210, 212, 214) are coupled to a tap-feedback and iDAC weighting module (218). In the example of FIG. 2, the tap-feedback and iDAC weighting module (218) may be embodied as automated computing machinery for receiving values stored in one or more latches (210, 212, 214) and providing input to the summing amplifier (208) to negate the effects of intersymbol interference. As such, the tap-feedback and iDAC weighting module (218) operates as part of a feedback loop to the summing amplifier (208). In the example of FIG. 2, the tap-feedback and iDAC weighting module (218) may include a digital-to-analog converter ('DAC') that converts a digital signal to an analog signal. For example, each DAC may be configured to convert the digital value stored in a latch (210, 212, 214) to an analog current that is fed into the summing amplifier (208). In such a way, the DAC may serve as a current source that introduces an appropriate voltage offset to the summing amplifier (208) for negating the impact of intersymbol interference caused by previously received signals.

In the example of FIG. 2, the DFE (202) can utilize the retained recent history of data signals that were received by the DFE (202) to cancel out the effects of intersymbol interference on a currently received data signal. The DFE (202) can utilize the retained recent history of data signals that were received by the DFE (202) to cancel out the effects of intersymbol interference on a currently received data signal because the amount of interference introduced by a previously received data signal can be measured and known. For example, the amount of interference introduced by a binary 1 received one clock cycle prior to the currently received data signal is a quantifiable amount, the amount of interference introduced by a binary 1 received two clock cycles prior to the currently received data signal is another quantifiable amount, the amount of interference introduced by a binary 0 received three clock cycles prior to the currently received data signal is yet another quantifiable amount, and so on. Consider an example in which an incoming signal is embodied as a differential signal that includes a first signal and a second signal, where the voltage between the two signals are used to determine whether the differential signal represents a binary 1 or a binary 0. For example, a differential voltage of 0.5 V could represent a binary 1 and a differential voltage of −0.5 V could represent a binary 0. In such an example, the amount of interference introduced by each data signal at a relative point in time may be represented by Table 1 below.

TABLE 1

Interference Table

| Binary Value | # of clock cycles prior | Interference amount (V) |
| --- | --- | --- |
| 0 | 1 | −.025 |
| 0 | 2 | −.0025 |
| 0 | 3 | −.00025 |
| 1 | 1 | .025 |
| 1 | 2 | .0025 |
| 1 | 3 | .00025 |

The example illustrated in Table 1 indicates, for example, that a binary 0 received in the immediately preceding clock cycle adds −0.025 V of differential voltage to a data signal received in a current clock cycle and a binary 1 received in the immediately preceding clock cycle adds 0.025 V of differential voltage to a data signal received in a current clock cycle. Similarly, Table 1 indicates that a binary 0 received in two clock cycles prior to the current clock cycle adds −0.0025 V of differential voltage to a data signal received in a current clock cycle and a binary 1 received two clock cycles prior to the current clock cycle adds 0.0025 V of differential voltage to a data signal received in a current clock cycle. In the example of FIG. 2, each of the voltage adjustments described above may be referred to as 'taps' and the values of such taps may be stored in the tap-feedback and iDAC weighting module (218).

Consider the example described above in which a data signal with a differential voltage of 0.5 V represents a binary 1 and a differential voltage of −0.5 V represents a binary 0. Assume in this example that each signal trails off such that the values in Table 1 accurately reflect the amount of residual voltage that remains in a data communications channel after each data signal has been transmitted. Further assume in this example that the current data signal is a binary 1 and the three immediately preceding signals were binary 100. In such an example, the input data signal to the summing amplifier (208) would detect a differential voltage of 0.52225 V. The voltage level would be equal to the sum of 0.5 V for the data signal (binary 1) received in the current clock cycle, 0.025 V for the data signal (binary 1) received in the previous clock cycle, −0.0025 V for the data signal (binary 0) received two clock cycles prior to the current clock cycle, and −0.00025 V for the data signal (binary 0) received three clock cycles prior to the current clock cycle. In such an example, if the sampled value of 0.52225 V were passed to the sample latch (210) as input, the sample latch (210) may not be able to properly identify the sampled voltage as a binary 1 or binary 0.

Because the amount of residual voltage that remains in a data communications channel after each data signal has been transmitted is known, and because the order in which the preceding data signals were received is known, a counteracting voltage (i.e., a tap) may be given to the summing amplifier (208) to negate the effects of intersymbol interference. The taps may be given to the summing amplifier (208) to negate the effects of intersymbol interference by summing the data signal received in the current clock cycle with the taps. Continuing with the example described above, a binary 1 stored in latch (210) would result in the summing amplifier (208) receiving a tap of −0.025 V, a binary 0 in latch (212) would result in the summing amplifier (208) receiving a tap of 0.0025 V, and a binary 0 in latch (214) would result in the summing amplifier (208) receiving a tap of 0.00025 V, such that the summing amplifier (208) processing the currently received data signal would output a value of 0.5 V, representing a binary 1. In such a way, the DFE (202) can remove the impact of intersymbol interference on a data signal received in the current clock cycle.

The DFE (202) of FIG. 2 also includes a data pattern checker (204). The data pattern checker (204) of FIG. 2 may be embodied, for example, as a comparator for comparing two data values, such as a sampled data pattern and a predetermined expected data pattern. In such a way, the data pattern checker (204) can be utilized to determine whether data signals output by the summing amplifier (208) match an expected series of data signals. The usage of such a data pattern checker (204) will be described in greater detail below.

The DFE (202) of FIG. 2 also includes on-chip DFE logic (206). In the example of FIG. 2, the on-chip DFE logic (206) may be embodied as a module of circuitry for controlling various operational aspects of the DFE (202). For example, the on-chip DFE logic (206) may be configured to execute adapative algorithms for ensuring that the taps values stored in the tap-feedback and iDAC weighting module (218) remain up to date.

Testing a DFE is generally implemented with computers, that is, with automated computing machinery. For further explanation, therefore, FIG. 3 sets forth a block diagram of automated computing machinery comprising an example computer (152) useful in testing a DFE. The computer (152) of FIG. 3 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154). Operating systems useful in testing a DFE include UNIX™, Linux™, Microsoft XP™, AIX™, IBM's i5/OS™, and others as will occur to those of skill in the art. The operating system (154) in the example of FIG. 3 is shown in RAM (168), but many components of such software typically are stored in non-volatile memory also, such as, for example, on a disk drive (170).

Figure 3:
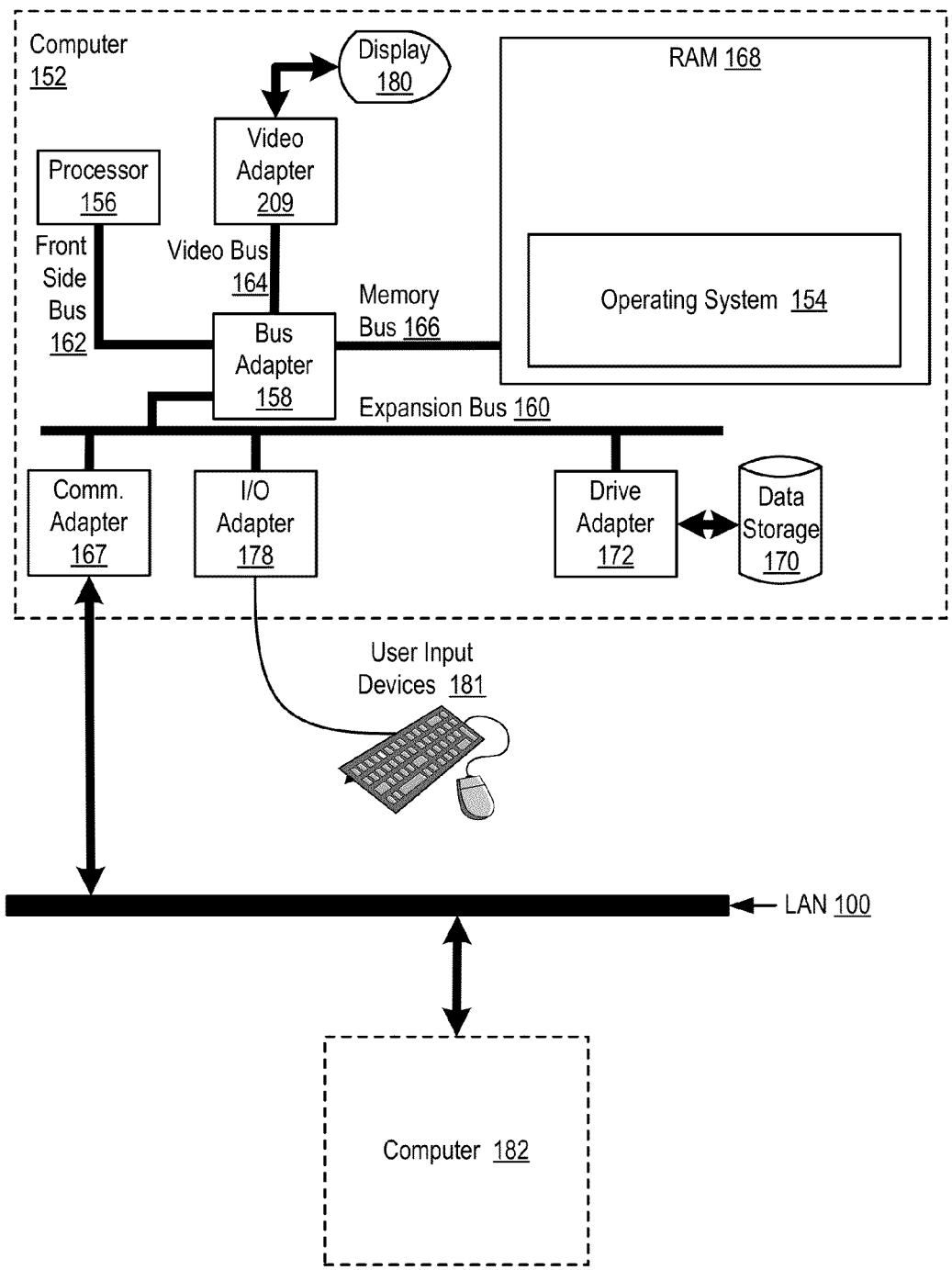
FIG. 3 sets forth a block diagram of automated computing machinery comprising an example computer useful in testing a DFE.

The computer (152) of FIG. 3 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for testing a DFE include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 3 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for testing a DFE include modems for wired dial-up communications, Ethernet (IEEE 802.3) adapters for wired data communications network communications, and 802.11 adapters for wireless data communications network communications.

Figure 4:
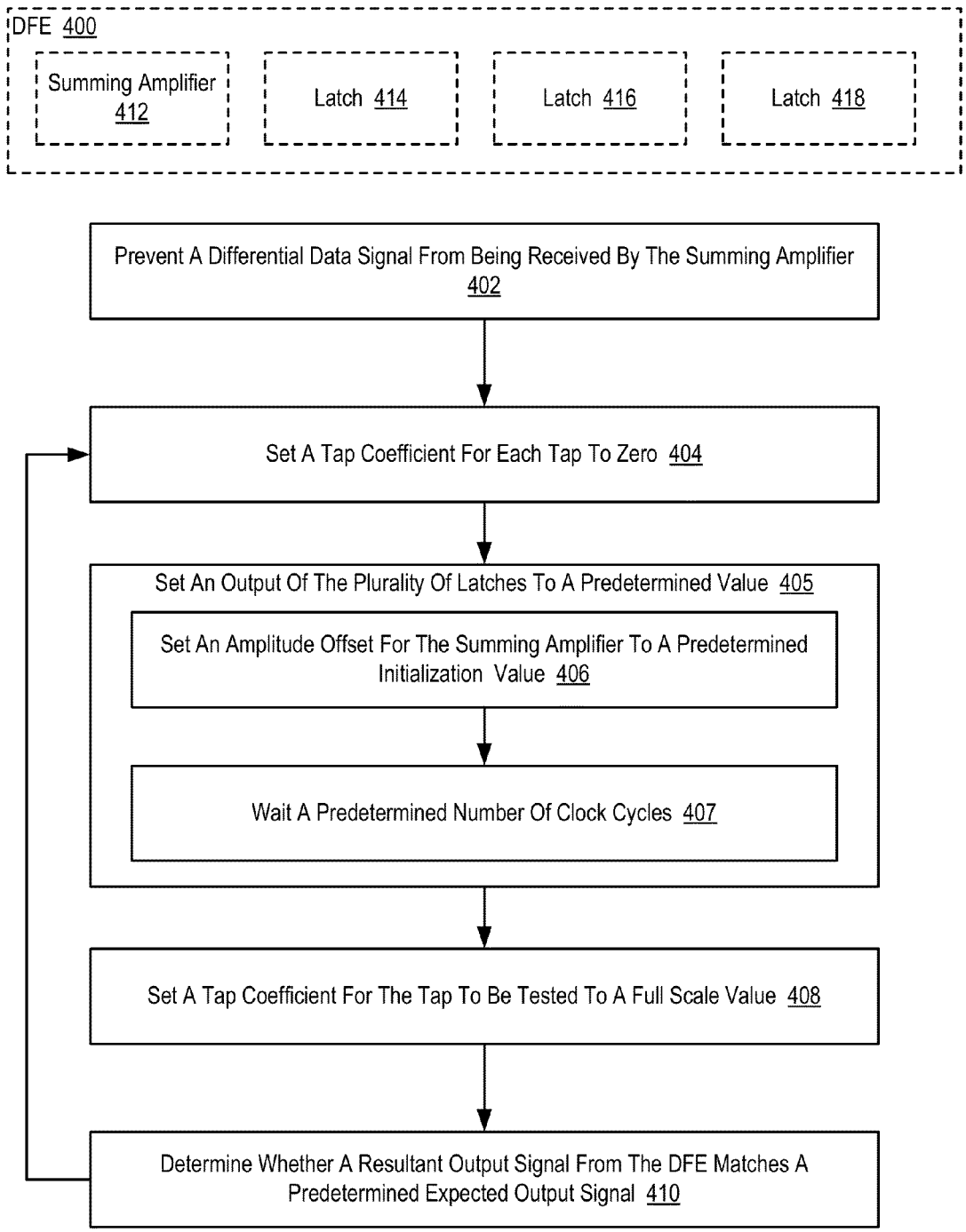
FIG. 4 sets forth a flow chart illustrating an example method for testing a DFE.

For further explanation, FIG. 4 sets forth a flow chart illustrating an example method for testing a DFE (400). In the example method of FIG. 4, the DFE (400) includes a summing amplifier (412) operatively coupled to a plurality of latches (414, 416, 418) and an input signal line for receiving a data signal. Although not illustrated in FIG. 4, the DFE (400) may be similar to the DFE described above with reference to FIG. 2.

The example method of FIG. 4 includes preventing (402) a differential data signal from being received by the summing amplifier (412). As described above with reference to FIG. 2, a summing amplifier in a DFE can receive an incoming data signal over a data signal line. In the example method of FIG. 4, preventing (402) a differential data signal from being received by the summing amplifier (412) causes the summing amplifier (412) to receive no data. That is, the summing amplifier (412) does not receive a voltage representing a binary 1 or a voltage representing a binary 0.

In the example method of FIG. 4, preventing (402) a differential data signal from being received by the summing amplifier (412) may be carried out, for example, by preventing a differential signal generator coupled to the summing amplifier (412) from generating a differential signal. In the example method of FIG. 4, a typical incoming data signal may be embodied as a differential data signal that rides on top of a common-mode signal. As such, even when an incoming differential data signal is prevented (402) from being received by the summing amplifier (412), the summing amplifier (412) still receives the common-mode voltage as a signal. The differential component of the signal received by the summing amplifier (412), however, is set to zero Volts such that there is no differential data signal received by the summing amplifier (412). Because the summing amplifier (412) is still biased, however, the summing amplifier (412) is operational and generates an output signal due to the common-mode signal received by the summing amplifier (412). As a result of the summing amplifier (412) generating an output signal, the output signal is passed to the latches (414, 416, 418) and the value in the latches (414, 416, 418) will result in counteracting voltages being sent to the summing amplifier (412) via the feedback loops depicted in greater detail in FIG. 2.

The example method of FIG. 4 also includes setting (404) a tap coefficient for each tap to zero. In the example method of FIG. 4, each tap represents a voltage offset that is applied to an incoming data signal in order to negate the effects of intersysmbol interference. Consider an example in which an incoming data signal is sampled in a current clock cycle. In such an example, a first tap represents a voltage offset that is applied to the incoming data signal in order to negate the effects of intersysmbol interference that resulted from a signal received in the clock cycle preceding the current clock cycle. Likewise, a second tap represents a voltage offset that is applied to the incoming data signal in order to negate the effects of intersysmbol interference that resulted from a signal received two clock cycles prior to the current clock cycle, a third tap represents a voltage offset that is applied to the incoming data signal in order to negate the effects of intersysmbol interference that resulted from a signal received three clock cycles prior to the current clock cycle, and so on.

In the example method of FIG. 4, the tap coefficient for a particular tap is used to determine the amount of counteracting voltage to be sent to the summing amplifier (412). Consider an example in which a data signal representing a binary 1 that was received one clock cycle prior to the currently clock cycle introduces 0.025 V of residual voltage into the data communications channel. Further assume that a data signal representing a binary 0 that was received one clock cycle prior to the currently clock cycle introduces −0.025V of residual voltage into the data communications channel. In such an example, a tap for a binary 1 may be set to −0.025V and a tap for a binary 0 may be set to 0.025V. The amount of counteracting voltage to be sent to the summing amplifier (412) may be determined, for example, by multiplying the tap by a tap coefficient. In such an example, setting (404) a tap coefficient for each tap to zero results in no counteracting voltage being provided to the summing amplifier (412) for each tap. In the example method of FIG. 4, setting (404) a tap coefficient for each tap to zero may be carried out by setting a value in a DAC vector to zero, such that the DAC does not provide any current to the summing amplifier (412). As such, setting (404) a tap coefficient for each tap to zero effectively shuts down the feedback loop described above.

The example method of FIG. 4 also includes setting (405) an output of the plurality of latches (414, 416, 418) to a predetermined value. In the example method of FIG. 4, setting (405) an output of the plurality of latches (414, 416, 418) to a predetermined value may include setting (406) an amplitude offset for the summing amplifier (412) to a predetermined initialization value. In the example method of FIG. 4, the summing amplifier (412) includes many current sources. For example, the data signal line and the feedback loops for each tap provide current to the summing amplifier (412). The summing amplifier (412) can also include an additional current source referred to herein as the 'amplitude' current source. In the example method of FIG. 4, setting (406) an amplitude offset for the summing amplifier (412) to a predetermined initialization value may therefore be carried out by controlling the amount of current provided by the 'amplitude' current source. For example, the amount of current provided by the 'amplitude' current source may be determined in dependence upon the tap to be tested. For example, if the tap to be tested is coupled to a DAC that can provide current to the summing amplifier (412) to offset the intersymbol interference caused by a previously received data signal, the amount of current provided by the 'amplitude' current source may be set to one-half of the full scale value of such a tap. By setting (406) an amplitude offset for the summing amplifier (412) to the predetermined initialization value, the summing amplifier (412) will generate a known output signal that can be used to flush the values contained in the latches (414, 416, 418), such that the state of the DFE (400) is known prior to testing a particular tap.

In the example method of FIG. 4, setting (405) an output of the plurality of latches (414, 416, 418) to a predetermined value may also include waiting (407) a predetermined number of clock cycles. The predetermined number of cycles can be equal to the number of taps that the DFE (400) can provide as feedback to the summing amplifier (412). In the example method of FIG. 4, waiting (407) a predetermined number of clock cycles has the effect of allowing the output signal that is generated by the summing amplifier (412) to propagate to all of the latches (414, 416, 418). More specifically, waiting (407) a predetermined number of clock cycles has the effect of allowing the output signal that is generated by the summing amplifier (412) when the predetermined initialization value of current is applied by the 'amplitude' current source to propagate to all of the latches (414, 416, 418). Because the tap coefficients for each tap are set to zero, feedback from the taps are not delivered to the summing amplifier (412) and the latches (414, 416, 418) may be flushed or otherwise set to a known state. Although setting (405) an output of the plurality of latches (414, 416, 418) to a predetermined value is described in FIG. 4 as being carried out by setting (406) an amplitude offset for the summing amplifier (412) to a predetermined initialization value and waiting (407) a predetermined number of clock cycles, readers will appreciate that setting (405) an output of the plurality of latches (414, 416, 418) to a predetermined value may be carried out in many ways, such as forcing the output values of the latches (414, 416, 418) to a predetermined value through other means of initializing a latch.

The example method of FIG. 4 also includes setting (408) a tap coefficient for the tap to be tested to a full scale value. Assume that a first tap is the tap to be tested. As described above, the tap coefficient for each tap was previously set (404) to zero, thereby resulting in tap providing no counteracting voltage to the summing amplifier (412) and effectively shutting down the feedback loop described above. In the example method of FIG. 4, setting (408) a tap coefficient for the tap to be tested to a full scale value has the effect of isolating one tap—the tap to be tested—resulting in the tap to be tested operating as the only tap that causes a counteracting voltage to be provided to the summing amplifier (412). In such a way, the operation of the latch (414) associated with the first tap can be isolated.

Consider an example in which the common-mode voltage is known to be 0.5V and a tap to be tested should introduce a counteracting voltage of 0.025V when a binary 0 was received during the clock cycle associated with the tap, and further assume that the tap to be tested should introduce a counteracting voltage of −0.025V when a binary 1 was received during the clock cycle associated with the tap. Because the latches (414, 416, 418) have been flushed or otherwise initialized, isolating the tap to be tested should result in the summing amplifier (412) outputting a specific value or sequence of values. When a binary 0 was received during the clock cycle associated with the tap, for example, the summing amplifier (412) should output a voltage of 0.525V. Similarly, when a binary 1 was received during the clock cycle associated with the tap, the summing amplifier (412) should output a voltage of 0.475V. In such a way, the operation of the particular tap and its associated computer hardware can be verified.

The example method of FIG. 4 also includes determining (410) whether a resultant output signal from the DFE (400) matches a predetermined expected output signal. In the example method of FIG. 4, the predetermined expected output signal represents the expected output from the summing amplifier (412) when the common-mode voltage is applied to the summing amplifier (412) and the tap coefficients for all taps other than the tap to be tested are set to zero, such that the tap to be tested is the only tap influencing the output of the summing amplifier (412). The predetermined expected output signal may be embodied, for example, as a sequence of binary values stored in the attached latches (414, 416, 418). As such, the resultant output signal from the DFE (400) may be compared to the predetermined expected output signal. If the signals match, the tap to be tested is functioning properly.

In the example method of FIG. 4, the steps of setting (404) a tap coefficient for each tap to zero, setting (406) an amplitude offset for the summing amplifier (412) to a predetermined initialization value, waiting (407) a predetermined number of clock cycles, setting (408) a tap coefficient for the tap to be tested to a full scale value, and determining (410) whether a resultant output signal from the DFE (400) matches a predetermined expected output signal are carried out iteratively for each tap to be tested. In such a way, the operation of each tap in the DFE (400) can be tested.

Example embodiments are described largely in the context of a fully functional computer system for testing a DFE. Readers of skill in the art will recognize, however, that embodiments may include a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the described steps in a computer program product. Persons skilled in the art will recognize also that, although some of the example embodiments described in this specification are oriented to software installed and executing on computer hardware, nevertheless, alternative embodiments may be implemented as firmware or as hardware.

As will be appreciated by one skilled in the art, embodiments may include a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described above with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present application is limited only by the language of the following claims.

What is claimed is:

1. A method of testing a Decision Feedback Equalizer ('DFE'), the DFE including a summing amplifier operatively coupled to a plurality of latches and an input signal line for receiving a data signal, the method comprising:
    preventing a differential data signal from being received by the summing amplifier; and
    testing a plurality of taps including, iteratively for each tap to be tested:
        setting a tap coefficient for each tap to zero;
        setting an output of the plurality of latches to a predetermined value, wherein the plurality of latches include a current sensing latch and a plurality of binary latches, the binary latches configured to store a sequence of binary values received from the current sensing latch;

setting a tap coefficient for the tap to be tested to a full scale value; and determining whether a resultant output signal from the DFE matches a predetermined expected output signal.

2. The method of claim 1 wherein setting the output of the plurality of latches to a predetermined value further comprises:

setting an amplitude offset for the summing amplifier to a predetermined initialization value; and waiting a predetermined number of clock cycles.

3. The method of claim 2 wherein the predetermined number of clock cycles is equal to a number of taps generated by the DFE.

4. The method of claim 1 wherein the predetermined initialization value is determined in dependence upon the tap to be tested.

5. An apparatus for testing a Decision Feedback Equalizer ('DFE'), the DFE including a summing amplifier operatively coupled to a plurality of latches and an input signal line for receiving a data signal, the apparatus comprising a computer processor, a computer memory operatively coupled to the computer processor, the computer memory including computer program instructions that, when executed, cause the apparatus to carry out the steps of:

preventing a differential data signal from being received by the summing amplifier; and preventing a differential data signal from being received by the summing amplifier; and testing a plurality of taps including, iteratively for each tap to be tested:

setting a tap coefficient for each tap to zero;

setting an output of the plurality of latches to a predetermined value, wherein the plurality of latches include a current sensing latch and a plurality of binary latches, the binary latches configured to store a sequence of binary values received from the current sensing latch;

setting a tap coefficient for the tap to be tested to a full scale value; and determining whether a resultant output signal from the DFE matches a predetermined expected output signal.

6. The apparatus of claim 5 wherein setting the output of the plurality of latches to a predetermined value further comprises:

setting an amplitude offset for the summing amplifier to a predetermined initialization value; and waiting a predetermined number of clock cycles.

7. The apparatus of claim 6 wherein the predetermined number of clock cycles is equal to a number of taps generated by the DFE.

8. The apparatus of claim 5 wherein the predetermined initialization value is determined in dependence upon the tap to be tested.

9. A computer program product for testing a Decision Feedback Equalizer ('DFE'), the DFE including a summing amplifier operatively coupled to a plurality of latches and an input signal line for receiving a data signal, the computer program product disposed upon a non-transitory computer readable medium, the computer program product comprising computer program instructions that, when executed, cause a computer to carry out the steps of:

preventing a differential data signal from being received by the summing amplifier; and testing a plurality of taps including, iteratively for each tap to be tested:

setting a tap coefficient for each tap to zero;

setting an output of the plurality of latches to a predetermined value, wherein the plurality of latches include a current sensing latch and a plurality of binary latches, the binary latches configured to store a sequence of binary values received from the current sensing latch;

setting a tap coefficient for the tap to be tested to a full scale value; and determining whether a resultant output signal from the DFE matches a predetermined expected output signal.

10. The computer program product of claim 9 wherein setting the output of the plurality of latches to a predetermined value further comprises: setting an amplitude offset for the summing amplifier to a predetermined initialization value; and waiting a predetermined number of clock cycles.

11. The computer program product of claim 10 wherein the predetermined number of clock cycles is equal to a number of taps generated by the DFE.

12. The computer program product of claim 9 wherein the predetermined initialization value is determined in dependence upon the tap to be tested.

13. The computer program product of claim 9 wherein the computer readable medium comprises a recordable medium.

* * * * *